(12) United States Patent
Wolf

(10) Patent No.: US 6,326,960 B1
(45) Date of Patent: Dec. 4, 2001

(54) VIDEO OUTPUT PHASE CONTROL IN A DECODER

(75) Inventor: Christopher K. Wolf, San Jose, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 09/148,683

(22) Filed: Sep. 4, 1998

(51) Int. Cl.[7] ..................................................... G09G 5/00
(52) U.S. Cl. ...................... 345/212; 348/399.1; 348/402; 348/439; 348/715; 348/510; 348/511; 348/423.1; 348/432.1; 348/460; 348/467; 348/512
(58) Field of Search ..................................... 345/213, 211, 345/212; 348/402, 439, 715, 399, 510, 511, 423.1, 432.1, 460, 467, 399.1; 382/236

(56) References Cited

U.S. PATENT DOCUMENTS

| | | | |
|---|---|---|---|
| 5,652,749 | * | 7/1997 | Davenport et al. ................. 348/512 |
| 5,812,144 | * | 2/2000 | Potu et al. ............................ 345/213 |
| 5,818,539 | * | 10/1998 | Naimpally et al. ................. 348/512 |
| 5,923,385 | * | 7/1999 | Mills et al. ........................... 348/715 |
| 5,923,784 | * | 7/1999 | Rao et al. ............................. 382/236 |
| 5,995,153 | * | 11/1999 | Moeller et al. ...................... 348/439 |
| 6,025,878 | * | 2/2000 | Boyce et al. ......................... 348/402 |
| 6,081,299 | * | 11/2000 | Kesselring ........................... 348/512 |
| 6,101,591 | * | 8/2000 | Foster et al. ......................... 348/512 |
| 6,148,135 | * | 11/2000 | Suzuki ................................. 348/512 |

* cited by examiner

Primary Examiner—Richard Hjerpe
Assistant Examiner—Ali A. Zamani
(74) Attorney, Agent, or Firm—Skjerven Morrill MacPherson LLP; Edward C. Kwok

(57) ABSTRACT

The present invention provides a method and apparatus for providing video output phase control in a decoder. In particular, the present invention provides a decoder that precisely aligns output of video display data with a time stamp associated with the video display data and thereby allows for efficient usage of compressed video buffer memory in the decoder. In one embodiment, the decoder includes a video output processor for displaying video data and a timer connected to the video output processor for providing video output phase control. A method is also provided for providing video output phase control in the decoder.

10 Claims, 2 Drawing Sheets

VIDEO OUTPUT PHASE CONTROL IN A DECODER

FIELD OF THE INVENTION

The present invention relates generally to a decoder and, more particularly, to a method and apparatus for video output phase control in a decoder.

BACKGROUND OF THE INVENTION

A typical decoder buffers data streams during variable and fixed delay. In particular, the depth of a buffer for variable delay is generally related to the delay in the decoder at a particular point in time. Also, in a typical decoder such as for an MPEG/MPEG2 (MPEG1 or MPEG2) decoder, variable and fixed delays can require significant buffering (e.g., system memory).

Thus, there remains a need for an efficient approach for buffering variable and fixed delays in a decoder. In particular, it would be desirable to provide an improved method and apparatus that efficiently utilizes memory in a decoder.

SUMMARY OF THE INVENTION

Accordingly, the present invention provides a method and apparatus for video output phase control in a decoder. In one embodiment, the decoder includes a timer, a counter, and a comparator. If the time required to display video data is a fixed time interval (or delay), then the comparator can be set to this expected time delay such that when the current time in the timer is equal to the time programmed in the comparator, the comparator sends a signal to reset the counter. The timer is programmed to compare the local time with a particular time that represents the presentation time minus the fixed delay of the decoder. Accordingly, video output phase control is provided and efficient buffering for variable and fixed delays in the decoder is provided.

Other aspects and advantages of the present invention will become apparent from the following detailed description and accompanying drawings.

DETAILED DESCRIPTION OF THE INVENTION

The present invention provides a method and apparatus for video output phase control in a decoder. In particular, a DVD (digital versatile disk)/DVB (digital video broadcast) decoder, in which it is desirable to efficiently transport, decode, and display MPEG/MPEG2 byte streams and to efficiently utilize system memory (e.g., RAM, DRAM, SDRAM), would significantly benefit from the method and apparatus of the present invention.

Figure 1:
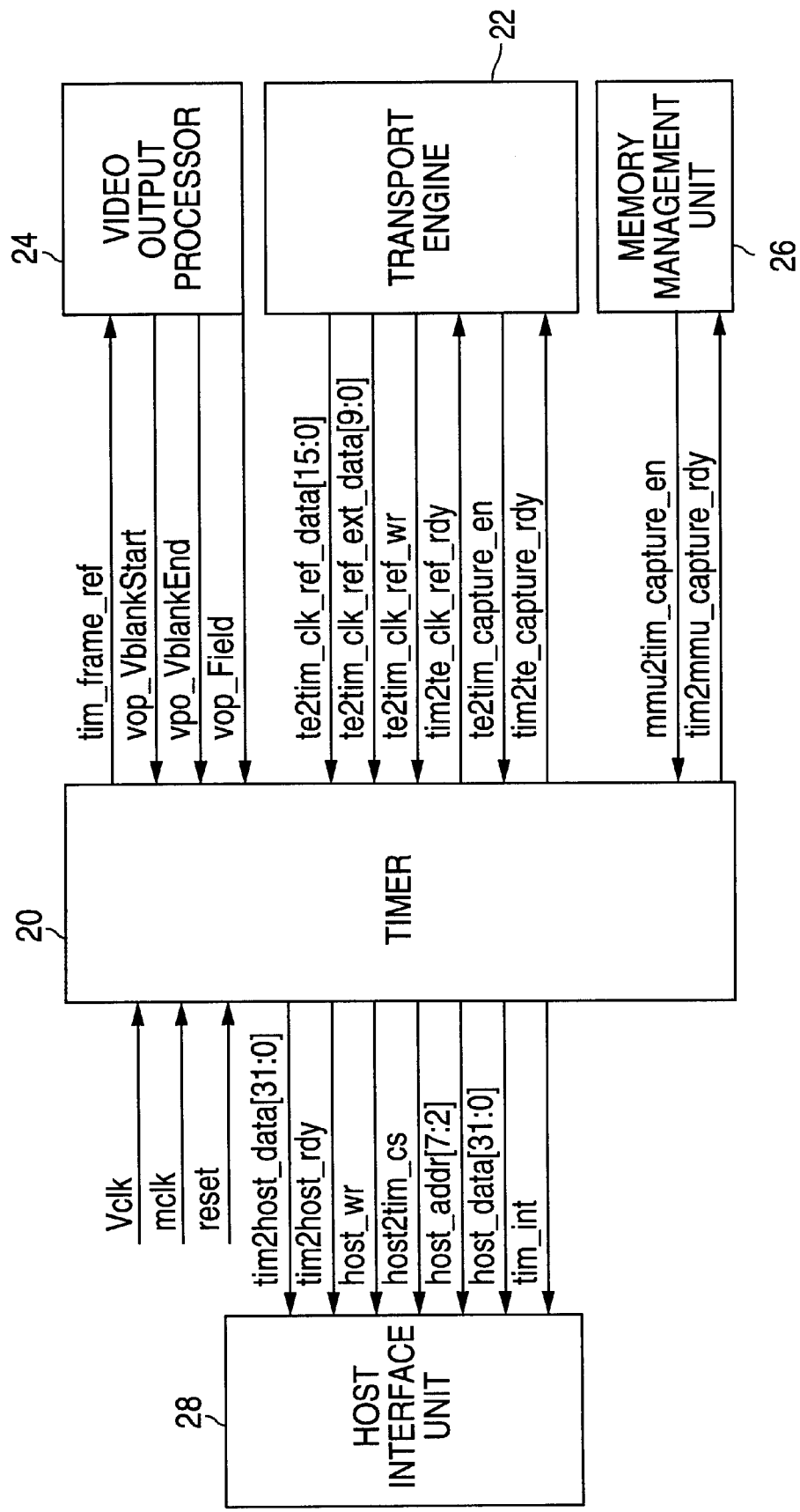
FIG. 1 shows a timer and the connections between the timer and other modules of a decoder in accordance with one embodiment of the present invention.

FIG. 1 shows a timer 20 and the connections between timer 20 and other modules of a decoder in accordance with one embodiment of the present invention. The decoder is described in greater detail in co-pending U.S. patent application Ser. No. 09/301,438 (US) and is herein incorporated by reference in its entirety.

Referring to FIG. 1, timer 20 has interfaces to a host interface unit (HIU) 28, a video output processor (VOP) 24, a transport engine (TE) 22, and a memory management unit (MMU) 26. In particular, timer 20 maintains the local version of the system clock (not shown) of the decoder. When starting up synchronization control, TE 22 supplies the time as dictated by the clock reference time stamps in the incoming byte stream, and timer 20 sets the local time to correspond to this value. Thus, timer 20 may synchronize to the incoming stream at start up. During steady state, timer 20 will not be reset, but timer 20 provides the current local time to TE 22.

Timer 20 is implemented to provide the following: (i) maintain a 29-bit real-time clock and hardware that is compatible with MPEG2 33-bit clock references and 9-bit clock reference extensions; (ii) provide a 27 MHz count resolution and an 11.65 second range; (iii) provide a current time can be set or read at any time by a host processor (the host processor (not shown) accesses timer 20 via HIU 28); (iv) latch current time when a vertical sync occurs; (v) latch current time on reception of a PCR (program clock. reference) or SCR (system clock reference) in the input stream by TE 22; (vi) latch current time when the host processor reads an audio output buffer pointer register in the MMU 26; (vii) when enabled by the host processor (e.g., programmed by the host processor), generate an interrupt when current time matches one of the three programmable compare values (i.e., three triggers); and (viii) when enabled by the host processor, reset the vertical sync generator when the current time matches the single programmable compare value. Thus, timer 20 provides a free-running real-time clock used by software in the decoder. Timer 20 is synchronous with the vclk (i.e., the 27 MHz pixel clock) (not shown).

Referring to FIG. 1, timer 20 also captures the current time when any of the three triggers described above is valid. For example, TE 22 provides a trigger when a clock reference field (e.g., PCR or SCR) occurs in an incoming byte stream. VOP 24 provides two separate triggers corresponding to the beginning and end of a vertical sync pulse. MMU 26 provides a trigger when the host processor reads the values of the audio output buffer read pointer.

The decoder typically involves both variable delay and fixed delay. The decoding of data streams generally involves variable delay. In contrast, the display of the decoded data streams generally involves a fixed delay. In particular, the variable delay changes over time, but there generally is a worst case delay (e.g., a bounded worst case). In MPEG/MPEG2 encoded data streams, 256 kilobytes of memory for compressed video data is typically required (as defined by the MPEG standard), and thus, an ideal decoder generally requires only 256 kilobytes of memory to buffer the compressed video data transport and decoding. Hence, an ideal decoder consumes and displays data in real time (i.e., the output phase is aligned precisely with the presentation time stamps associated with the displayed data). Thus, no extra buffering is required.

However, in a non-ideal decoder, extra buffering is often required. But the video output phase control of the present invention efficiently minimizes the buffer memory (not shown) required due to the variable delay in the decoder as further discussed below with respect to FIG. 2.

Figure 2:
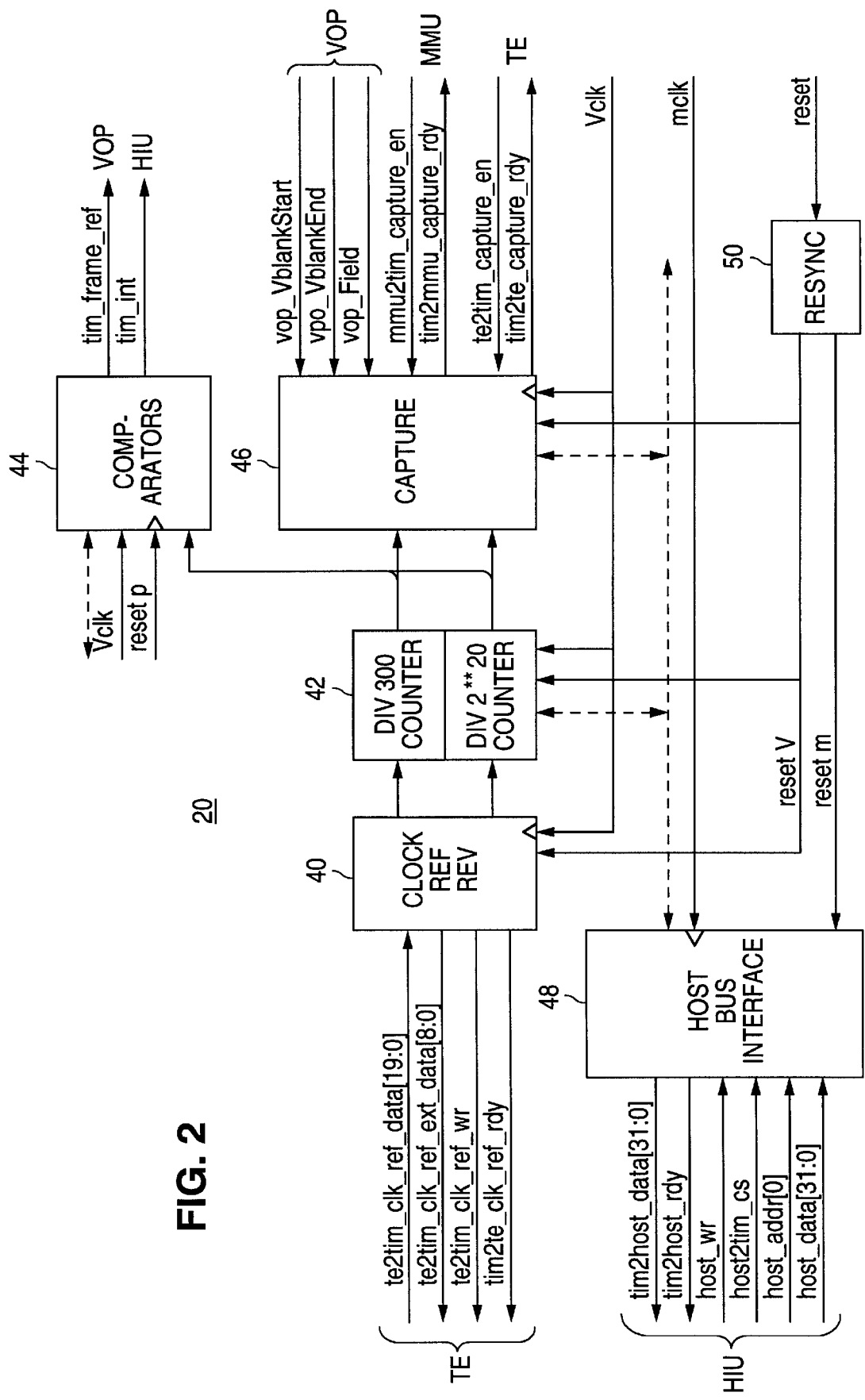
FIG. 2 shows the timer of FIG. 1 in greater detail in accordance with one embodiment of the present invention.

FIG. 2 shows timer 20 in greater detail in accordance with one embodiment of the present invention. In particular, timer 20 includes a clock reference receiver 40, a counter 42, comparators 44, a capture circuit 46, a host bus interface 48, and a resync circuit 50. Capture circuit 46 stores the current value of counter 42 when a trigger signal is asserted. In timer 20, the trigger signals may be vop_VblankStart, vop_VblankEnd, mmu2tim_capture_en, and te2time_capture_en. There is a separate storage register associated with each trigger. In one embodiment, a storage register is a set of D flip-flops, clocked by vclk, and enabled by the associated trigger. The register associated with the vop_VblankStart and vop_VblankEnd signals captures the state of the vop_Field signal as well as the current value of counter 42. Resync 50 sychronizes the reset signal to the two clock domains, vclk and mclk. There are several ways to synchronize a reset signal to the two clock domains, vclk and mclk. The simplest way is to feed the reset signal into the D input of a flip-flop, feed the Q output of the flip-flop into the D input of a second flip-flop, and take the Q output of the second flip-flop as the synchronized signal. Both flip-flops are clocked by the synchronizing clock signal.

In one embodiment, counter 42 increments at a 27 MHz rate and is divided internally into two sections: a 9-bit wide divide-by-300 counter and a 20-bit binary counter. The other modules of timer 20 serve to either set the counter or to read the value of the counter and generate related hardware events as further discussed below.

Timer 20 advantageously allows the decoder to control when the display (e.g., an NTSC/PAL TV monitor connected to VOP 24 of FIG. 1) reaches a particular point on the display. In other words, timer 20 of the present invention solves a phase problem, because not taking into account the fixed delay results in the display being out of phase with the presentation time stamp associated with the displayed data.

As discussed above with respect to FIG. 1, timer 20 maintains the local time, and the local time is synchronized to the incoming stream. Referring to FIG. 2, timer 20 also includes comparators 44. The host processor via host bus interface 48 programs comparators 44. In particular, the host processor programs comparators 44 so that timer 20 generates a pulse to reset a counter of VOP 24 of FIG. 1. Accordingly, after the host processor appropriately programs comparators 44, timer 20 compares the programmed time with the local time and generates a reset of the horizontal and vertical offset counters of VOP 24 of FIG. 1 at the programmed time (i.e., when the local time (the time of the incoming stream) equals the time programmed in comparators 44). As a result, video output phase control in the decoder is provided in accordance with one embodiment of the present invention.

For example, a presentation time stamp for a particular picture frame defines the display (presentation) time of the particular picture frame. The host processor, which knows the actual fixed delay of the display subsystem (e.g., VOP 24 of FIG. 1), calculates the appropriate amount of time based on the expected fixed delays of the display subsystem and appropriately programs comparators 44. Thus, when the local time (i.e., the incoming stream time) equals the programmed time in comparators 44, timer 20 resets the display (e.g., the counter of VOP 24 of FIG. 1) so that video output phase control is maintained. Thus, the display phase of VOP 24 of FIG. 1 is synchronized with the incoming stream. In other words, the actual display is precisely aligned with the time stamp associated with the displayed video data.

In particular, a time stamp defines the time that the associated video data should be displayed. However, a time stamp is typically only accurate on the order of about 300 pixels. In other words, a time stamp is generally accurate to within half of a line's worth on a standard display (e.g., an NTSC/PAL TV monitor). Thus, a time stamp defines basically which half of which line the display should be working on displaying at a particular instant of time (i.e., the value of the time stamp). But it requires greater than an instant of time (usually a fixed period of time) to actually paint the picture (i.e., display the picture frame data). Painting the picture implies accessing data stored in a buffer memory (e.g., a buffer stored in a system memory) used by VOP 24 of FIG. 1. But the process of decoding data usually requires a variable amount of time. Hence, the present invention minimizes the buffer memory required during the fixed delay, that is the buffer memory used by VOP 24 of FIG. 1 by precisely aligning the display phase with the incoming stream.

Accordingly, because the present invention provides for such precise alignment, variable and fixed buffer memory requirements for the decoder are minimized. For example, in an MPEG/MPEG2 decoder, only 256 kilobytes (or possibly even less than 256 kilobytes) of compressed video buffer memory may be needed. Without this synchronization, at least 512 kilobytes would be needed, which is particularly advantageous in a system that is trying to cost-effectively offer a maximum number of features and system functionality.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A decoder for a multimedia data stream, the multimedia stream including a video data stream with presentation time stamps embedded therein, comprising:

a host processor interface for communication with a host processor;

a video output processor connected to a buffer memory holding the video data of the video data stream, the video output processor including a counter which control timing in displaying of the video data; and a timer connected to the video output processor and the host processor interface, the timer (i) maintaining a local time, (ii) receiving time values from the host processor over the host processor interface, each time value corresponding to one of the presentation time stamps, and (iii) providing a video output phase control signal to reset the counter in the video output processor when the local time matches one of the time values received, so that output of display data is precisely aligned with a time stamp associated with the display data, wherein the time value corresponds to one of the presentation timestamps offset by an expected delay related to a processing time of a display system.

2. The apparatus of claim 1 further comprising:

a memory management unit connected between the timer and the buffer memory, the memory management unit providing access to the buffer memory.

3. The apparatus of claim 1 further comprising:

a transport engine connected to the timer, the transport engine receiving the video data and demultiplexing, depacketizing, and transporting the video data stream into byte streams in the decoder.

4. The apparatus of claim 1, wherein the timer further receives a clock reference signal, the apparatus further comprising counters connected to receive the clock reference signal.

5. An apparatus as in claim 1, wherein the multimedia data stream comprises MPEG-1 or MPEG-2 video data.

6. An apparatus as in claim 1, wherein the counter of the video output processor controls a timing of a vertical synchronization signal.

7. An apparatus as in claim 1, wherein the counter of the video output processor controls a timing of a horizontal synchronization signal.

8. A method for providing video output phase control in a decoder for a multimedia data stream including video data with presentation timestamps embedded therein, the method comprising:

receiving said data stream, demultiplexing, depacketizing, and transporting the data stream into byte streams in the decoder;

for each byte stream, computing, in a host processor, time values corresponding to the presentation timestamps and an expected delay value corresponding to a processing time of a display system;

programming each of the time values into a comparator of a timer circuit, the timer circuit maintaining a local time;

comparing the local time with the time programmed in the comparator; and sending a reset signal to reset a counter of a video output processor when the local time equals the time programmed in the comparator, the counter controlling timing of output of display data, so that output of display data is precisely aligned with a time stamp associated with the display data thereby allowing for efficient usage of buffer memory in the decoder.

9. The method of claim 8 wherein the expected delay corresponds to the fixed delay time of a video display subsystem of the decoder, including access time to a buffer memory for retrieving a picture frame of video data.

10. The method of claim 9 wherein the picture frame of video data is decoded MPEG1 or MPEG2 video data.

\* \* \* \* \*

UNITED STATES PATENT AND TRADEMARK OFFICE
CERTIFICATE OF CORRECTION

PATENT NO.     : 6,326,960 B1
DATED          : December 4, 2001
INVENTOR(S)    : Wolf, Christopher K.

It is certified that error appears in the above-identified patent and that said Letters Patent is hereby corrected as shown below:

<u>Column 2,</u>
Line 19, delete "." period after "clock"

Signed and Sealed this

Twenty-fifth Day of March, 2003

JAMES E. ROGAN
*Director of the United States Patent and Trademark Office*